US012059656B2

United States Patent
Hamzik et al.

(10) Patent No.: US 12,059,656 B2
(45) Date of Patent: Aug. 13, 2024

(54) MEMBRANES FOR REMOVING METALLIC SPECIES FROM AMINES

(71) Applicant: Entegris, Inc., Billerica, MA (US)

(72) Inventors: James Hamzik, North Billerica, MA (US); Justin Brewster, North Billerica, MA (US); Siddarth Sampath, Tyngsboro, MA (US); Jad Ali Jaber, Westford, MA (US); Aabid A. Mir, Bedford, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/488,897

(22) Filed: Sep. 29, 2021

(65) Prior Publication Data
US 2022/0105476 A1    Apr. 7, 2022

Related U.S. Application Data

(60) Provisional application No. 63/086,827, filed on Oct. 2, 2020.

(51) Int. Cl.
*B01D 71/26* (2006.01)
*B01D 67/00* (2006.01)

(52) U.S. Cl.
CPC ....... *B01D 71/261* (2022.08); *B01D 67/0093* (2013.01); *B01D 2257/60* (2013.01)

(58) Field of Classification Search
None
See application file for complete search history.

(56) References Cited

U.S. PATENT DOCUMENTS

| | | | |
|---|---|---|---|
| 5,767,229 A | 6/1998 | Arretz | |
| 9,201,308 B2 | 12/2015 | Rao | |
| 9,379,402 B2 | 6/2016 | Yoshimura | |
| 2010/0143733 A1* | 6/2010 | Mickols | B01D 67/0088 428/474.4 |

(Continued)

FOREIGN PATENT DOCUMENTS

| | | |
|---|---|---|
| EP | 3342477 B1 | 1/2020 |
| WO | 2017205722 A1 | 11/2017 |

OTHER PUBLICATIONS

Tauqir A. Sherazi et al, Guanidine functionalized radiation induced grafted anion-exchange membranes for solid alkaline fuel cells, International Journal of Hydrogen Energy, vol. 40, Issue 1, 2015, pp. 786-796 (Year: 2015).*

(Continued)

*Primary Examiner* — Jason M Greene
*Assistant Examiner* — Eric J McCullough

(57) ABSTRACT

The disclosure is directed to removal of metal contaminants from fluids, as well as ligand-modified filter materials useful for carrying out such methods. The filters and methods of this disclosure are particularly effective for removal of metals from liquid compositions comprising amines. Such liquid compositions with significantly reduced amounts of metals can be used in a microelectronic manufacturing process, such as liquids for removing photoresist or liquids used in etching. The ligand-modified filters, such as ligand-modified porous membranes, can be configured for use in a microelectronic manufacturing system, which can be utilized in the system as a point of use metal-removal feature for liquids entering the system.

13 Claims, 1 Drawing Sheet

(56) References Cited

U.S. PATENT DOCUMENTS

2012/0252091 A1* 10/2012 Rasmussen ........ B01D 67/0093
530/421
2016/0166979 A1   6/2016 Park
2020/0254398 A1   8/2020 Hamzik

OTHER PUBLICATIONS

Biotage PS-TBD polymer-Supported Base Information Sheet; Biotage, 2016.
Karolina et al., Physical Sciences Reviews., Polymers in separation processes., pp. 1-32., 2017.
Kovacevic, B. et al.; Basicity of Some Organic Superbases in Acetonitrile; Organic Letters, vol. 3, No. 10, pp. 1523-1526; 2001.

* cited by examiner

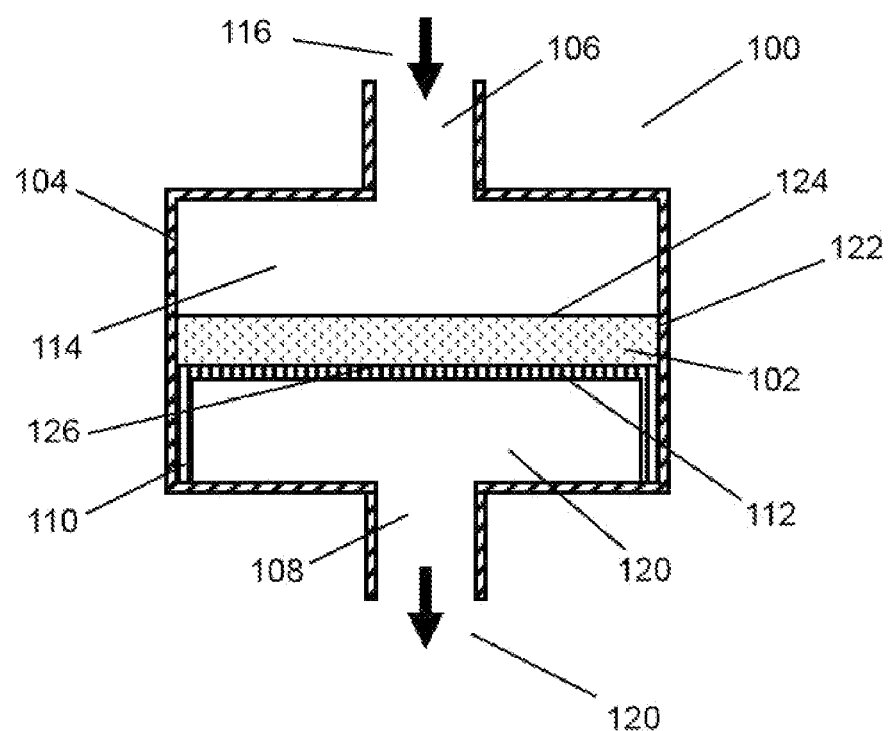

MEMBRANES FOR REMOVING METALLIC SPECIES FROM AMINES

CROSS-REFERENCE TO RELATED APPLICATIONS

This application claims the benefit under 35 USC 119 of U.S. Provisional Patent Application No. 63/086,827, filed Oct. 2, 2020, the disclosure of which is hereby incorporated herein by reference in its entirety.

FIELD OF THE INVENTION

The following disclosure relates to ligand-modified articles, such as filter membranes, and to methods of using the articles for removing metals from liquid compositions.

BACKGROUND

Filters are used to remove unwanted materials from a flow of a useful fluid and have become important features in a wide variety of industrial technologies. Fluids that are treated to remove unwanted materials include water, liquid industrial solvents and processing fluids, industrial gases used for manufacturing or processing, and liquids that have medical or pharmaceutical uses. Unwanted materials that are removed from fluids include impurities and contaminants such as particles, microorganisms, and dissolved chemical species. Specific examples of filter applications include their use with liquid materials for semiconductor and microelectronic device manufacturing.

Filters can remove unwanted materials by a variety of different ways, such as by size exclusion or by chemical and/or physical interaction with material. Some filters are defined by a structural material providing a porous architecture to the filter, and the filter is able to trap particles of a size that are not able to pass through the pores. Some filters are defined by the ability of the structural material of the filter, or of a chemistry associated with the structural material, to associate and interact with materials that pass over the filter. For example, chemical features of the filter may enable association with unwanted materials from a stream that passes over the filter, trapping those unwanted materials such as by ionic, coordinative, chelation, or hydrogen-bonding interactions. Some filters can utilize both size exclusion and chemical interaction features to remove materials from a filtered stream.

In some cases, to perform a filtration function, a filter includes a filter membrane that is responsible for removing unwanted material from a fluid that passes through. The filter membrane may, as required, be in the form of a flat sheet, which may be wound (e.g., spirally), flat, pleated, or disk-shaped. The filter membrane may alternatively be in the form of a hollow fiber. The filter membrane can be contained within a housing or otherwise supported so that fluid that is being filtered enters through a filter inlet and is required to pass through the filter membrane before passing through a filter outlet.

The removal of ionic materials such as dissolved anions or cations from solutions is important in many industries, such as the microelectronics industry, where ionic contaminants and particles in very small concentrations can adversely affect the quality and performance of microprocessors and memory devices. In particular, it may be desirable to remove metal-containing materials such as metal ions from liquid compositions that are used for device fabrication. Metal-containing materials can be found in different types of liquids that are used for microelectronic manufacturing.

There remain various unresolved technical challenges for the removal of metal-containing materials from fluids. In particular, there is a need for improved methodologies for the removal of metal ions such as $Fe^{2+}$ and $Fe^{3+}$ from fluids comprising amines and amino alcohols. Aqueous amines are employed in the fabrication of semi-conductors. For example, hydroxylamine is often a component in photoresist strippers, which removes photoresist after lithography. Reduction of metallic ion contaminants across the semiconductor supply chain is of increasing importance towards the effort to reduce defects and improve yield. Metallic ion reduction is critical for materials that come in direct contact with the wafer surface such as hydroxylamine and ammonium hydroxide. Traditional methods for metallic ion reduction, such as ion-exchange filtration, do not adequately reduce metal ions from aqueous amines. Hydroxyl amine is particularly problematic as it forms complex structures with metals, such as transition metals, for example, iron.

SUMMARY

This disclosure provides various inventive embodiments that are directed to removal of metal contaminants from fluids, as well as ligand-modified filter materials useful for carrying out such methods. The filters and methods of this disclosure are particularly effective for removal of metals from liquid compositions. Filtered liquid compositions with significantly reduced amounts of metals can be used in a microelectronic manufacturing process, such as liquids for removing photoresist or liquids used in etching. The ligand-modified filters, such as ligand-modified porous membranes, can be configured for use in a microelectronic manufacturing system, which can be utilized in the system as a point of use metal-removal feature for liquids entering the system.

Accordingly, one aspect of the disclosure is a membrane comprising:
a polymer having appended thereto a ligand, the ligand comprising at least one moiety represented by the structure:

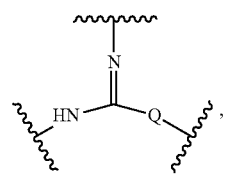

wherein Q is chosen from —$CH_2$—, —N(R)—, or CH(N)—, and wherein R is a $C_1$-$C_{20}$ hydrocarbyl group.

Another aspect of the disclosure is a method for removing one or more metal or metal ions from a liquid composition. In certain embodiments, the liquid composition comprises amines. As used herein, the term "amines" is not limited in any way, and by way of example can be chosen from primary, secondary, and tertiary amines, and such amines substituted by one or more alkyl groups, hydroxyl groups, or other functional groups as well as such amines in combination with water, i.e., aqueous amines.

BRIEF DESCRIPTION OF THE DRAWINGS

The disclosure may be more completely understood in consideration of the following description of various illustrative embodiments in connection with the accompanying drawings FIG. 1 is an illustration of an exemplary cross-section of a filter with a single porous membrane having a ligand of the disclosure appended thereto.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

A first aspect of the disclosure is a membrane comprising:
a polymer having appended thereto a ligand,
the ligand comprising at least one moiety represented by the structure:

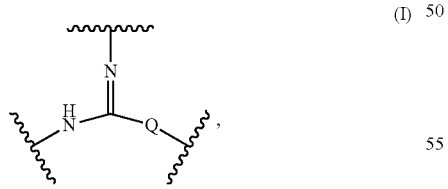
(I)

wherein Q is chosen from —CH$_2$—, —N(R)—, or —CH(N)—, and wherein R is a C$_1$-C$_{20}$ hydrocarbyl group.

In one embodiment, the term "C$_1$-C$_{20}$ hydrocarbyl" refers to a saturated or unsaturated, linear, branched, or cyclic hydrocarbon, having between one and twenty carbon atoms and optionally substituted by one or more heteroatoms and functional groups. Exemplary functional groups include halo, nitro, cyano, amino, alkoxy, or alkanoyloxy. The undulating lines above, i.e., ⁓⁓⁓, indicate either a point of attachment of the moiety to the membrane or to another group of atoms which form the remainder of the ligand.

In certain embodiments, the ligand comprises at least one guanidine moiety. In other embodiments, the ligand comprises at least one amidine moiety. In other embodiments, the ligand comprises at least one moiety of the structure:

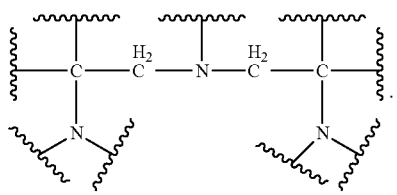 [SMILES: *N(CC(*)(*)N(*)*)CC(*)(*)N(*)*]

In certain embodiments the ligand comprises a guanidine moiety attached via a benzyl group having the structure:

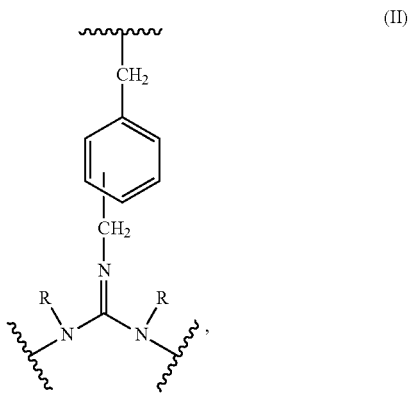
(II)

wherein each R is independently chosen from hydrogen, C$_1$-C$_4$ alkyl, cyclohexyl, and phenyl.

In certain embodiments, the ligand comprises a compound having the structure:

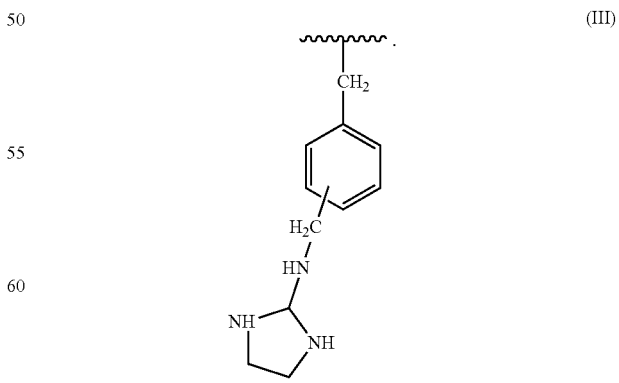
(III)

In other embodiments, the ligand comprises a guanidine moiety has the structure (IV):

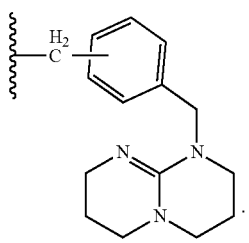
(IV)

In another embodiment, the ligand comprises an amidine moiety:

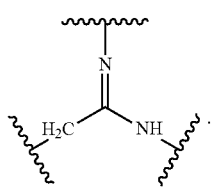 [SMILES: *CC(=N*)N*]

In one embodiment, the ligand comprises a moiety chosen from compounds of the structures:

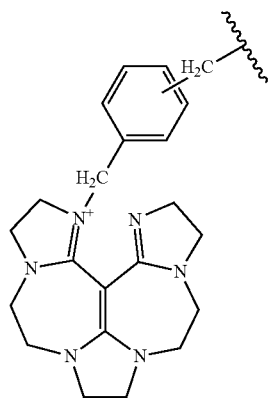

(VI-C)

In this embodiment, it will be appreciated that in certain of the above structures, the point of attachment is a quaternary nitrogen atom. The counterion (not shown) is produced from the starting material, which is reacted with the ring system, and is chosen from halogens.

In another embodiment, the ligand is chosen from the structures:

(VII-A)

, and (VII-B)

In one embodiment, the ligand is chosen from polyguanidines. Examples of polyguanidines include the following:

-continued

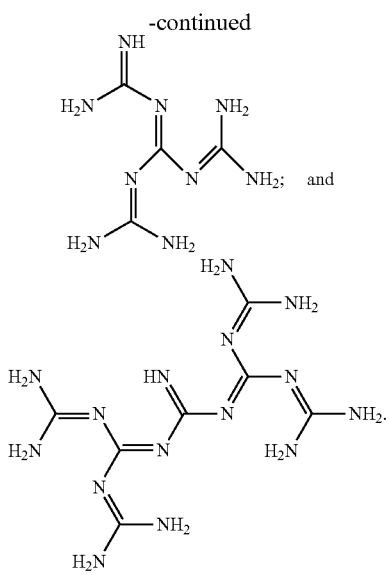

In this embodiment, the ligand can be attached or appended to the polymer membrane via one of the free amine groups reactive with a group on the polymer surface, or reactive with another material present at the surface of the polymer, thereby forming a coating comprising the ligand.

In one embodiment, the ligand comprises the structure:

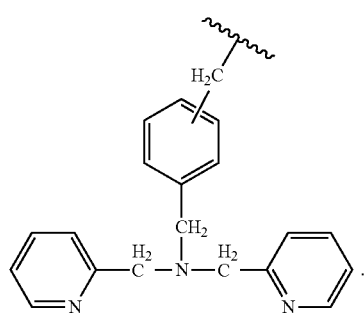

In one embodiment, the filter membrane is in the form of a porous membrane.

A filter material on which the ligand is attached can be made of any suitable material or combination of materials. Exemplary filter materials can include one or more of a polymer, a metal, a ceramic, or a natural material. Further, in some aspects, the material of the filter can have a chemistry suitable for attachment to the ligand. Alternatively, the surface of the filter material can be modified so that it is chemically reactive with the ligand or a derivative thereof. The ligands as described above may be affixed or appended to an underlying porous polymeric membrane.

A "filter," refers to an article having a structure that includes a filter membrane. For example, the filter can be in any useful form for a filtering process, for example, a porous membrane, the filter being made from one or more filter materials such as polymers, including synthetic and natural polymers, metal-containing materials, such as alloys, natural materials, ceramic, carbon fiber, etc. In some embodiments, the ligand can be covalently bound to the filter membrane.

The filter can be in any desired form suitable for a filtering application. Material that forms the filter can be a structural component of a filter itself and that provides the filter with a desired architecture. The filter can be porous or non-porous and can be of any desired shape or configuration. The filter per se can be a unitary article such as a nonwoven porous filter membrane.

In some embodiments, the filter material is formed from a polymeric material, a mixture of different polymeric materials, or a polymeric material and a non-polymeric material. Polymeric materials forming the filter can be crosslinked together to provide a filter structure with a desired degree of integrity.

Polymeric materials that can be used to form membranes of the disclosure (i.e., filter membranes) include hydrophobic polymers. In some embodiments, the membranes include a polyolefin or a halogenated polymer. Exemplary polyolefins include polyethylene (PE), polypropylene (PP), polymethylpentene (PMP), polybutene (PB), polyisobutylene (PIB), and copolymers of two or more of ethylene, propylene, and butylene. In a further particular embodiment, the membranes include ultra-high molecular weight polyethylene (UPE). UPE filter materials, such as UPE membranes, are typically formed from a resin having a molecular weight (weight average molecular weight) greater than about $1\times10^6$ Daltons (Da), such as in the range of about $1\times10^6$-$9\times10^6$ Da, or $1.5\times10^6$-$9\times10^6$ Da. Crosslinking between polyolefin polymers such as polyethylene can be promoted by use of heat or crosslinking chemicals, such as peroxides (e.g., dicumyl peroxide or di-tert-butyl peroxide), silanes (e.g., trimethoxyvinylsilane), or azo ester compounds (e.g., 2,2'-azo-bis(2-acetoxy-propane). Exemplary halogenated polymers include polytetrafluoroethylene (PTFE), polychlorotrifluoro-ethylene (PCTFE), fluorinated ethylene polymer (FEP), polyhexafluoropropylene, and polyvinylidene fluoride (PVDF).

In other embodiments, the membranes include a polymer chosen from polyamide, polyimide, polysulfone, polyethersulfone, polyarylsulfone polyamides, polyacrylates, polyesters, nylons, celluloses, cellulose esters, polycarbonates, or combinations thereof.

Ligands of structure (II) above can be synthesized by methodology as set forth in U.S. Pat. No. 5,767,229, incorporated herein by reference. Ligands of structure (III) above can be synthesized as shown for example in Example 7 below. Ligands of structure (V, VI, VII) above can be synthesized by reacting the corresponding cyclic amidine (Tricyclic 2,4-diaminovinamidine and pentacyclic amidines, Angewandte Chemie—International Edition, 26, 1164-1165. Angewandte Chemie—International Edition, 26, 1165-1167. Nachrichtenaus ChemieTechnikund Laboratorium, 38, 1214-1226) with Glycidyl vinyl ether or 4-chloro methyl styrene.

The ligands of the disclosure can be bound or appended to the underlying porous membrane by numerous methods. See, for example, methodologies described in U.S. Patent Publication 2020-0254398, incorporated herein by reference.

In general, the ligands of the disclosure can be attached to a polymeric membrane through attachment with a reactive cross-linked coating. For example, the filter material can be coated with a solution of an amine reactive polymer such as poly(vinylbenzyl chloride), poly(epichlorohydrin), or an epoxy resin. The coated and dry membrane can then be cross-linked by reacting with a diamine, polyamine, or any other multifunctional reactive crosslinker and the remaining reactive sites used for attachment of the desired ligand. Using a similar method, the cross-linking and ligand attachment can occur simultaneously, where the ligand itself functions as a crosslinker. In one mode of practice, the desired ligand is first reacted with a halogenated compound possessing olefinic unsaturation, such as 4-(chloromethyl) styrene. The ligand, thus possessing a vinyl benzyl group may then be applied as a solution to a porous membrane, along with another reactive compound to serve as crosslinker, such as N,N'-methylenebis(acrylamide), and then subjected to UV radiation in the presence of a suitable photoinitiator, such as Ciba® IRGACURE® 2959, to provide a crosslinked coating on the porous membrane, said coating having the desired ligand covalently bound therein. Other examples of crosslinkers include triethylene glycol dimethacrylate, triethylene glycol diacrylate, and ethylene glycol divinyl ether, and the like. In another mode of practice, the ligand of the disclosure can be grafted to the membrane using methodologies taught in US Patent Publication 2020-0254398, incorporated herein by reference, and WO2017/205722. This grafting can be accomplished by UV-irradiation of the polymeric membrane in the presence of a photoinitiator and an unsaturated monomer comprising the ligand of the disclosure. In another mode of practice, the grafting may utilize electron beam or gamma irradiation.

The concentration of ligand can be sufficient to allow the ligand to be immobilized on a surface of the filter material at a desired density. A ligand solution can be applied to surfaces of filter material by any useful technique, such as by spraying, submerging, soaking the filter material solution, or the like. Desirably, the entire surface of the filter can be contacted with the solution, such as all internal surfaces of a porous filter membrane. If necessary, the application step may include manipulation of the filter material, e.g., by rolling or squeezing a porous filter medium to cause wetting of all surfaces of the porous filter.

In various examples of methods and devices of the present description, the filter includes a porous filter membrane with the ligand appended to the polymeric material that forms the membrane. As used herein, a "porous filter membrane" is a porous solid that contains porous (e.g., microporous) interconnecting passages that extend from one surface of the membrane to an opposite surface of the membrane. The passages generally provide tortuous tunnels or paths through which a liquid being filtered must pass. Metal species of sizes small enough to pass through the pores of the membrane can be trapped on the membrane by interaction with the ligand, such as by a chelation interaction between the ligand and the metal. This is referred to as a "non-sieving filtration mechanism."

The filter can also function to prevent any particles (e.g., metal containing particles) present within the liquid that are larger than the pores from entering the microporous membrane or can function to trap the particles within the pores of the microporous membrane (i.e., wherein particles are removed by a sieving-type filtration mechanism). The liquid to be treated can pass through the membrane resulting in flow-through having a reduced amount of metals, such as a reduced amount of ionic metal species, a reduced amount of metal-containing particulates, or both.

Accordingly, a porous polymeric membrane on which the ligand is attached can remove metal and metal ion contaminants in a solution that is passing through the membrane, as well as any material that is of a size too large to pass through the pores of the membrane.

Porous membranes of the disclosure can be described with reference to one or more properties of the membrane. Example porous polymeric filter membranes as described herein can be characterized by physical features that include pore size, bubble point, and porosity. For example, the membrane can be described in terms of bubble point, which is commonly used to reflect pore size.

The bubble point method is based on the premise that, for a particular fluid and pore size with constant wetting, the pressure needed to force an air bubble through the pore is in inverse proportion to the size of the hole. The diameter of the capillary can be calculated by determining the pressure required to force water out of the capillary. A Porosimetry Bubble Point test method measures the pressure required to push air through the wet pores of a membrane. A bubble point test is thus a well-known method for determining the pore size of a membrane. To determine the bubble point of a porous material a sample of the porous material is immersed in and wetted with ethoxy-nonafluorobutane HFE 7200 (available from 3M) at a temperature of 20-25° C. (e.g., 22° C.). A gas pressure is applied to one side of the sample by using compressed air and the gas pressure is gradually increased. The differential pressure at which wet flow is equal to one-half the dry flow (flow without wetting solvent) is called the bubble point.

In certain aspects of the disclosure, the porous polymeric membrane can have a bubble point in the range of from about 2 psi to about 400 psi, about 4 psi to about 200, or about 4 psi to about 160 psi, when ethoxy-nonafluorobutane (HFE-7200) is used as the wetting solvent, and at a temperature of 22° C.

Alternatively, pore size can be measured by known techniques such as by Mercury Porosimetry (MP), Scanning Electron Microscopy (SEM), Liquid Displacement (LLDP), or Atomic Force Microscopy (AFM).

The porous polymeric filter membrane can have any pore size that will allow the filter membrane to be effective for performing as a filter membrane. The pore size can be correlated with bubble point determination. In some embodiments, porous membranes can have an average pore size in a range of from about 0.001 microns to about 5 or 10 microns, e.g., from 0.01 to 0.8 microns. The average pore size can be selected based on one or more factors that include: fluid flow rate, pressure, pressure drop considerations, viscosity considerations, impurities in the liquid to be treated (such as amount of metal impurities), and any particle size of the impurities.

Further, the disclosure contemplates use of polymeric membranes with generally uniform pore sizes resulting from a higher degree of pore symmetry, as well as membranes with non-uniform pore sizes (variable pore diameters) resulting from pore asymmetry. Pores can be isotropic or anisotropic, skinned or unskinned, symmetric or asymmetric, and any combination of these.

A porous polymer filter layer as described may have any porosity that will allow the porous polymer filter layer to be effective as described herein. Example porous polymer filter layers can have a relatively high porosity, for example a porosity of at least 60, 70 or 80 percent. As used herein, and in the art of porous bodies, a "porosity" of a porous body (also sometimes referred to as void fraction) is a measure of the void (i.e., "empty") space in the body as a percent of the total volume of the body and is calculated as a fraction of the volume of voids of the body over the total volume of the body. A body that has zero percent porosity is completely solid.

A filter membrane of the present invention can be useful with any type of industrial process that requires a high purity amine-containing liquid material as an input. Non-limiting examples of such processes include processes of preparing microelectronic or semiconductor devices, a specific example of which is a method of filtering liquid process material used for semiconductor photolithography. The filters of the present disclosure can remove metal ions and metal-containing particulates from a process liquid or solvent used for preparing microelectronics or semiconductors and may also remove other non-metal particulate material by the sieving action of the membrane. In particular, the filters of the present disclosure are particularly efficacious in removing iron ions from amine-containing liquids.

Porous membranes of the disclosure can be of any desired geometric configurations suitable for use in a system for reducing metal or metal ion contamination in a fluid stream. For example, the porous membranes described herein can have any one or more of a variety of geometric configurations or forms. For example, the porous membrane can have any one or more shapes selected from circular, semi-circular, oval, semi-oval, or polygonal such as square, rectangular, hexagonal, or octagonal, etc. The porous membrane can be in the form of a flat sheet, a corrugated sheet, a pleated sheet, and a hollow fiber, among others.

A porous polymeric filter membrane as described can be in the form of a sheet or hollow fiber having any useful thickness, e.g., a thickness in a range from 20 to 400 microns, e.g., from 40 or 80 to 100 or 200 microns.

Porous membranes of the disclosure can be associated with a support structure, a housing, or both. For example, the coated porous membrane can be supported by a frame, bracket, clip, web, net, and cage, and the like. In some constructions, at least part of the support structure can be a housing, as described herein. Alternatively, the porous membrane is unsupported.

The porous membrane can be present as a part of a filter assembly that includes a housing. For example, the housing is fluidically sealed (aside from inlet and outlet ports) and able to hold a volume of liquid and configured to allow the liquid to pass through the membrane. A housing can be used to form a larger filter structure such as a filter assembly (single or multilayer) or a filter cartridge that is used in a filtering system. The filtering system will place the filter membrane, e.g., as part of a filter assembly or as part of a filter cartridge, in a filter housing to expose the filter membrane to a flow path of a liquid chemical to cause at least a portion of the flow of the liquid chemical to pass through the filter membrane, so that the filter membrane removes an amount of the impurities or contaminants from the liquid chemical. The structure of a filter assembly or filter cartridge may include one or more of various additional materials and structures that support the composite filter membrane within the filter assembly or filter cartridge to cause fluid to flow from a filter inlet, through the filter material (e.g., filter membrane), and through a filter outlet. The filter membrane supported by the filter assembly or filter cartridge can be in any useful shape, e.g., a pleated cylinder, a cylindrical pad, one or more non-pleated (flat) cylindrical sheets, a pleated sheet, among others.

An embodiment of the disclosure includes a filter device and a method of removing metal contaminants from a liquid, wherein the liquid is passed through a porous polymeric membrane that has the ligand affixed thereto. As shown in FIG. 1, the disclosure provides a filter 100 that includes a porous polymeric membrane 102. The porous polymeric membrane 102 includes a ligand affixed on a surface of the membrane. The filter 100 can have a housing 104 that provides a structure to the filter 100 and that fluidically seals an internal portion of the filter. The housing 104 can be any shape and size, such as cylindrical, polygonal, etc.

One portion of the filter can include an inlet port 106, to receive a metal/metal ion-containing fluid composition to be filtered. The inlet port 106 can be configured to be connected to a fluid supply line. As such, the inlet port 106 can include a valve, a gasket, etc. (not shown) to facilitate connection to a fluid supply. The metal/metal ion-containing fluid composition to be filtered can flow through inlet port 106 in direction indicated by arrow 116, and into a headspace 114 in the filter 100, as defined by an input-facing surface 124 of porous polymeric membrane 102, the internal surface of the housing 104, and the inlet port 106. In embodiments, the filter can be constructed so the headspace has a volume that is a desired percentage of the total internal volume of the filter.

The internal portion of the filter can include the porous membrane in any suitable placement or arrangement, with FIG. 1 showing the porous polymeric membrane 102 having a disc-like architecture (a cross-sectional view is shown). A side 122 of the porous polymeric membrane 102, such as the outer circumference of the membrane, can be in contact with the inner surface of the housing 104. The porous polymeric membrane 102 can also have an input-facing surface 124, which first contacts the metal/metal ion-containing fluid, and an output-facing surface 126, from which treated fluid with reduced amounts of metal/metal ions flow. Aspects of the filter can optionally be described in terms of the range of the ratio of the surface area of the input-facing surface 124 to the volume of the porous polymeric membrane 102, or the ratio of the surface area to the thickness of the filter.

The filter 100 can also include one or more features that support the porous polymeric membrane 102 within the filter. Any arrangement for supporting the filter can be used and can include one or more distinct structural feature(s), such as a frame, frame, bracket, clip, web, net, and cage, and the like, or a material such as an adhesive can be used to support the membrane. A combination of an adhesive and a structural supporting feature can be used. In an embodiment, and with reference to FIG. 1, the filter includes a frame having frame portions 110 and 112, with frame portion 110 in contact with the inner surface of the housing 104, which is attached to portion 112. Portion 112 can be in contact with the output-facing surface 124 of the porous polymeric membrane 102 and can provide support to the membrane during filtering. Frame portion 112 can have a grid-like structure to freely allow filtered liquid to pass into the backspace 120 of the filter, while still providing structural support to the polymeric porous membrane under increased fluidic pressures.

In use, a liquid enters the filter through inlet port 106 in direction indicated by arrow 116, and then fills the headspace 114 within the filter 100. Sufficient fluidic pressure is applied to cause the fluid to move through the porous polymeric membrane at a desired flow rate.

Exemplary flow rates for porous membranes are in the range of about 0.1 L/min to about 40 L/min, or about 5 L/min to about 20 L/min. Alternatively, the flow rate for a porous membrane is expressed in terms of the amount of liquid flowed per area of the filter per time (e.g., Liter/$m^2$/h=LMH), such as about 100 LMH/bar to about 30,000 LMH/bar, or more preferably about 5,000 LMH/bar to about 15,000 LMH/bar.

In some embodiments, the filter of the disclosure includes a composite membrane arrangement. For example, a filter with a composite membrane can include two or more filter materials, such as two or more filter articles. For example, the filter can include a first porous polymeric membrane that includes one of the ligands, and a second filter material that does not include the ligand present in the first porous polymeric membrane (i.e., a different ligand or some other ligand) or that is in some way different from the first porous polymeric membrane. The second filter material can also be in the form of a porous membrane, or can be different, such as having a non-porous form. The second filter material can be made of the same or of a different polymeric material than the first membrane, and can either be modified, such as modified with a ligand not present in the first membrane (e.g., the ligand), or unmodified.

In some embodiments, the filter includes a first porous polymeric membrane that includes the ligand, and a second porous polymeric membrane that includes no ligand or a different ligand. In certain embodiments, the first and second porous polymeric membranes are constructed from the same or a similar polymeric material and have the same or a similar pore size. In other embodiments, the first and second porous polymeric membranes are constructed from the different polymeric materials and/or have different pore sizes.

The filter of the disclosure as described can be useful for filtering a liquid to remove undesired metal-containing material (e.g., contaminants or impurities) from the liquid to produce a high purity liquid that can be used as a material of an industrial process. In particular, a porous polymeric filter membrane can be useful to remove a dissolved and/or suspended metal containing contaminant(s) from a liquid that is flowed through the membrane using a combination of a sieving mechanism and ligand binding of the metal ions. That is, larger metal-containing particles can be trapped by the filter by size restriction according to pore size, and metal ions which otherwise can travel through the pores, are captured by interaction with the ligand immobilized on the membrane.

The filter material(s) including the ligand can be used to remove metals and metal ions from fluids having levels of these materials that are too high for desired processes.

Exemplary metals that can be removed from the fluids using the ligand-modified filter materials of the disclosure include alkali metals which include the following chemical elements in group 1 of the periodic table: lithium (Li), sodium (Na), potassium (K), rubidium (Rb), and cesium (Cs). Other exemplary metals that can be removed from the fluids using the ligand-modified filter materials of the disclosure include alkaline earth metals which are the following chemical elements in group 2 of the periodic table: beryllium (Be), magnesium (Mg), calcium (Ca), strontium (Sr), barium (Ba), and radium (Ra). Other exemplary metals that can be removed from the fluids using the ligand-modified filter materials of the disclosure include transition metal which are elements in the d-block of the periodic table, which includes groups 3 to 12 on the periodic table, and include, but are not limited to transitions metals such as titanium (Ti), vanadium (V), chromium (Cr), manganese (Mn), iron (Fe), cobalt (Co), nickel (Ni), copper (Cu), zinc (Zn), yttrium (Y), zirconium (Zr), molybdenum (Mo), ruthenium (Ru), palladium (Pb), silver (Au), cadmium (Cd), tungsten (W), and mercury (Hg). Other exemplary metals that can be removed from the fluids using the ligand-modified filter materials of the disclosure include post transition metals (groups 13-15), which include aluminum (Al), gallium (Ga), indium (In), tin (Sn), thallium (Tl), lead (Pb), and bismuth (Bi). In one embodiment, the ligand-modified filters of the disclosure preferentially remove substantially all of the iron and zinc from such solutions. In one embodiment, the ligand-modified filter materials of the disclosure remove substantially all of the iron from such solutions, for example, down to less than about 1 ppb (parts per billion).

Metal contaminants can refer to neutral, negatively charged, or positively charged metal species and combinations thereof which may be present at equilibrium. The metals can be in the liquid in the form of dissolved ions, suspended charged particles, colloids, or other aggregates, and any of these metal forms can be removed from the fluids using the ligand-modified filter materials of the disclosure include. Several metal ions, for example Fe and Al, can exist as oxides in water. These kinds of ions can form amphoteric colloidal particles or complexes. In basic conditions, some of the metal ions can exits as hydroxides, oxides, oxyhydroxides, and other anions, or any combination of these. In some fluids, metal ions may form species that are amphoteric and can include one or more of these groups and these can exist as either cationic or anionic complexes depending upon the conditions (pH, temperature, ionic strength) of the fluid.

Metal ionic impurities in a variety of fluids may be detected using ion chromatography. The removal of metal material from a fluid treated by the filters of the disclosure can be also determined using inductively coupled plasma mass spectrometry (ICP-MS).

As noted above, in one embodiment, the liquid composition comprises amines. As used herein, the term "amines" is not limited in any way and generally refers to any compound comprising a moiety of the formula

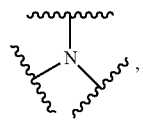

and can, for example, be chosen from primary, secondary, and tertiary amines, and such amines substituted by one or more hydroxyl groups, alkyl groups, or other functional groups.

Examples include:
  hydroxylamine
  ethanolamine
  triethanolamine
  diethylene triamine
  methyl amine
  ethyl amine
  trimethyl amine
  triethyl amine
  3-diethylaminopropylamine
  pyrrole
  1,2-diaminopropane
  pyrrolidine
  anisole
  aniline
  N, N-dimethyl aniline
  4-ntroanisole
  3-nitroanisole
  4-trifluoromethyl aniline
  Dopamine
  Epinephrine
  Norepinephrine
  n-butyl amine
  sec-butyl amine
  t-butyl amine
  N-methyl diethanolamine
  N-tert-butyldiethanolamine
  2-dimethylaminoethanol
  2-(diethylamino)ethanol 2-(dibutylamino)ethanol
1-[2-(diethylamino)ethoxy]ethanol
6-dimethylamino-1-hexanol
diisopropylamine
2-(diethylamino)-1,2-propanediol
3-dimethlamino-1-propanol
3-diethylamino-1-propanol
N-tert-butyldiethanolamine
(2-methylbutyl)amine
Tris(2-ethylhexyl)amine
4-pentyne-1-amine
1,4-benzodioxan-6-amine
(3-methylphenyl)amine
allyl amine
cyclohexyl amine
(3-butoxyphenyl)amine
4,5,6-trimethylprimidin-2-amine
1-benzyl-1H-pyrazol-3-amine
1-ethyl-1H-imidazol-3-amine
diallyl amine
1-isobutyl-1H-benzimidazol-2-amine
1-propyl-1H-tetrazol-5-amine
(1-cyclopropylpropyl)amine
(2-cycloheptylethyl)amine
(2-cyclooctylethyl)amine
(3-cyclopentylpropyl)amine
1,2-benzisoxazol-6-amine
1,5-naphthyridine-3-amine
1,6-naphthyridine-2-amine
1-methyl-1H-benzimidazol-6-amine
1-methyl-1H-pyrazol-4-amine
2,4,6-trifluorobenzylamine
2,4,6-trimethylpyridin-3-amine
2-chlorobiphenyl-4-amine
2-ethylcyclopropan-1-amine A filter membrane of the present description can be useful with any type of industrial process that requires a high purity liquid material as an input. Non-limiting examples of such processes include processes of preparing microelectronic or semiconductor devices, processes of preparing pharmaceutical compositions, and diagnostic (e.g., medical diagnostic) compositions and methods. Methods and filters of the disclosure can be used in any of these areas.

A specific example is a method of filtering a liquid process material used for semiconductor photolithography. Examples of contaminants present in a process liquid used for preparing microelectronic or semiconductor devices may include metal ions dissolved in the liquid, solid particulates suspended in the liquid, and gelled or coagulated materials (e.g., generated during photolithography) present in the liquid. In embodiments, the methods and filters of the disclosure are used to provide purified, low metal containing liquid compositions for front-end cleaning tools which are used to create the foundation for an integrated circuit. For example, the filters of the disclosure can be used to purify cleaning and etching agents, to minimize product contamination and improve process efficiencies (such as etch rate). In chemical-mechanical polishing processes, water is used in addition to reagents and abrasive particles.

EXAMPLES

Example 1—Cleaning of Porous Polymeric Resins

The following example demonstrates a method used to clean porous polymeric resins for use in removal of trace metals from amines and aqueous amines.

First, 50 g of each porous polymeric resin was weighed out and placed into a clean 1liter PTFE bottle (Savillex). The resins were wetted with 500 mL IPA (Isopropanol Gigabit®, KMG) and gently agitated for 1 hour. After an hour the resins were allowed to settle, and the IPA was decanted. Next, the resins were exposed to 500 mL of a mixture of 70% IPA/10% HCl (Hydrochloric Acid 37% Gigabit®, KMG) and gently agitated for 1 hour. After an hour the resins were allowed to settle and the 70% IPA/10% HCl was decanted. Next, the resins were washed and exchanged into deionized water (DIW) several times and the DIW was decanted. Next, the resins were exchanged into 500 mL of 2% NH$_4$OH (Ammonium Hydroxide 29% Cleanroom® MB, KMG) and gently agitated for 1 hour. Next, the resins were washed and exchanged into DIW several times and the DIW was decanted. Next, the resins were exposed to 500 mL of 10% HCl and gently agitated for 16 hours. After 16 hours the resins were allowed to settle and the 10% HCl was decanted. Finally, the resins were exchanged several times with DIW followed by several exchanges with IPA and placed in a convection oven at 70° C. until dry. The cleaned and dry resins were placed in a clean PTFE jar until used.

Example 2—Measurement of Metallic Species Reduction in 25% Hydroxyl Amine by Porous Polymeric Resins Containing 1,5,7-triazabicyclo[4,4,0]dec-5-ene Ligand Using Static Soaking Experiments The following example demonstrates a method used to measure the ability of porous polymeric resins containing 1,5,7-triazabicyclo[4,4,0]dec-5-ene (TBD) to reduce metal concentration in 25% Hydroxyl amine under conditions of static soaking. The results demonstrate that resins with TBD are effective at reducing metallic species, including, from solution after contact with the resin.

A cross-linked poly(styrene-co-divinylbenzene) resin with TBD attached (Biotage® PS-TBD, Biotage) was cleaned using a method similar to Example 1. A 25% Hydroxyl amine solution containing Fe was obtained. Next, 0.2 g of the cleaned and dried resin was measured out and placed in a clean 25 mL PTFE jar (Savillex). Next, 20 mL of the 25% Hydroxyl amine solution was added to the PTFE jar containing the cleaned resins. The jars were capped and rotated for 16 hours. After 16 hours the resins were allowed to settle, and the liquid was decanted into vials for analysis. The metal concentration for each liquid sample was measured by ICP-MS (Inductively-Coupled Plasma Mass Spectrometry). The entire experiment was run in duplicate to ensure repeatability. The experiment demonstrates that a resin cross-linked poly(styrene-co-divinylbenzene) resin with TBD attached was able to reduce metal species, including a >96% reduction of Fe, while also effective in removing more than 50% of the Na, K, Mg, Mn, Cr, Al, Ni, Zn, Ba, and Pb, from a 25% Hydroxyl amine solution.

Example 3—Preparation of Reactive 1,5,7-triazabicyclo[4,4,0]dec-5-ene Vinyl Monomer The following example demonstrates a method to prepare a solution containing a reactive vinyl monomer with a 1,5,7-triazabicyclo[4,4,0]dec-5-ene moiety.

In a jar a solution was prepared by dissolving 4.2 g of 1,5,7-triazabicyclo[4,4,0]dec-5-ene (CAS #5807-14-7, Sigma) in 17.5 g of deionized water. A separate solution was prepared by dissolving 4-(Chloromethyl)Styrene (CAS #1592-20-7, TCI) in 43.7 g of Dimethylformamide. The 4-(Chloromethyl)Styrene/Dimethylformamide was added to the jar containing the 1,5,7-triazabicyclo[4,4,0]dec-5-ene/deionized water, the jar containing the resulting mixture was tightly capped and the solution was rotated at 80° C. for 6 hours. After 6 hours the jar containing the resulting solution was removed from heat and allowed to cool to room temperature.

Example 4—Preparation of UPE Membrane with Stable Surface Coating Containing (1,5,7-triazabicyclo[4,4,0]dec-5-ene)

This example demonstrates surface modification of 50 nm pore size rated UPE membrane with a stable surface coating containing (1,5,7-triazabicyclo[4,4,0]dec-5-ene) ligand.

The surface modification was achieved by applying a photo initiated cross-linked coating that incorporated the Vinylbenzyl-(1,5,7-triazabicyclo[4,4,0]dec-5-ene) monomer prepared in Example 3. First, a monomer solution was prepared by adding by weight 7% Vinylbenzyl-(1,5,7-triazabicyclo[4,4,0]dec-5-ene), 2% Methylenebisacrylamide, 0.4% Irgacure 2959, 10% Deionized water, and 80.6% Isopropanol. Next, the unmodified 50 nm UPE membrane was cut into 47 mm diameter coupons, and then submerged into the monomer solution. Next, the coupons were removed from the monomer solution and immediately placed between two clear polyethylene sheets and excess liquid was nipped off using a rubber roller. The monomer imbibed membrane coupons were then removed from the polyethylene sheets and allowed to air dry for 15 minutes. After 15 minutes of drying, the dried coupons were wetted with Galden® HT 135 (Solvay) and immediately placed between two polyethylene sheets and run through a Fusion Systems broad band UV lamp at a speed of 6 feet/minute. The UV cured membrane coupons were removed from the polyethylene sheets, allowed to dry, washed with Isopropanol, water and twice with methanol, and then dried.

Example 5—Measurement of Fe Reduction in 2 and 14% Ammonium Hydroxide by a UPE Membrane Containing (1,5,7-triazabicyclo[4,4,0]dec-5-ene) ligand using static soaking experiments The following example demonstrates a method used to measure the ability of a 50 nm pore size rated UPE membrane containing (1,5,7-triazabicyclo[4,4,0]dec-5-ene) to reduce Fe concentration in 2% and 14% $NH_4OH$ under conditions of static soaking. The results demonstrate that a UPE membrane with (1,5,7-triazabicyclo[4,4,0]dec-5-ene) is effective at removing Fe from 2% and 14% $NH_4OH$ after contact with the membrane.

First, a 50 nm pore size rated UPE membrane containing (1,5,7-triazabicyclo[4,4,0]dec-5-ene) was prepared using a method similar to Example 4 and then cut into 47 mm coupons. Next, the membrane coupons were cleaned using a method similar to Example 1. Next, 2% and 14% $NH_4OH$ solutions were spiked with target concentration of 2500 ppt of Fe using PlasmaCAL Single Element Calibration Standards, SCP SCIENCE. Next, the clean 47 m coupons were placed in separate clean 25 mL PTFE jar (Savillex) and the 2% and 14% Fe spiked $NH_4OH$ were added to the individual jars. The PTFE jars containing the $NH_4OH$ and membrane coupons were capped and rotated for 16 hours. After 16 hours the jars were opened, and the membrane coupons removed. The metal concentration of the membrane treated $NH_4OH$ was determined using Inductively coupled plasma mass spectrometry (ICP-MS). The results show that in 2% $NH_4OH$ the Fe was reduced by about 94%, and in 14% $NH_4OH$, the Fe was reduced by about 88% after membrane treatment. The reduction of Fe in the membrane treated samples confirms the ability of a UPE membrane with (1,5,7-triazabicyclo[4,4,0]dec-5-ene) incorporated into the surface coating to remove Fe from 2 and 14% $NH_4OH$ when in contact with the solution.

Example 6—Measurement of Metallic Species Reduction in 25% Hydroxyl Amine by Porous Polymeric Resins Containing Bispicoylamine Ligand Using Static Soaking Experiments The following example demonstrates a method used to measure the ability of porouspolymeric resins containing Bispicolylanine to reduce metal concentration in 25% Hydroxylamine under conditions of static soaking. The results demonstrate that resins with Bispicolylamine are effective at reducing metallic species from solution after contact with the resin.

A resin with a macroporous polystyrene crosslinked with divinylbenzene polymeric backbone with Bispicolylamine attached (Puromet MTS9600, Purolite) was cleaned using a method similar to Example 1. A 25% Hydroxyl amine solution was obtained, containing a given Fe concentration. Next, 0.2 g of the cleaned and dried resin was measured out and placed in a clean 25 mL PTFE jar (Savillex). Next, 20 mL of the 25% Hydroxyl amine solution was added to the PTFE jar containing the cleaned resins. The jars were capped and rotated for 16 hours. After 16 hours the resins were allowed to settle, and the liquid was decanted into vials for analysis. The metal concentration for each liquid sample was measured by ICP-MS. The entire experiment was run in duplicate to ensure repeatability. The experiment demonstrates that resin with a macroporous polystyrene crosslinked with divinylbcnzene polymeric backbone with Bispicolylamine attached was able to reduce certain metal species from Hydroxyl amine from 25% Hydroxyl amine by resin with Bispicolylarnine attached. In this case Fe was reduced by about 77% and Na and Mg were reduced by greater than 50%.

Example 7—Proposed Preparation of Ligand (III)

Di-tert-butyldicarbonate is added drop wise to a solution of 2-chloroimidazolidine and triethylamine in dichloromethane (240 mL). The reaction mixture is stirred overnight at room temperature. Water was added, and the phases were separated. The organic layer is washed with water and saturated aq NaCl, and then is dried over $Na_2SO_4$, and is evaporated off to isolate pyrrolidine-1,3-carboxylic acid tert-butyl ester. The isolated product can then be reacted with 4-ethenylbenzenemethanamine in tetrahydrofuran to afford the compound B, which upon acid hydrolysis yields the desired compound of Ligand (III).

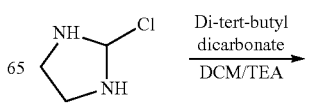

-continued

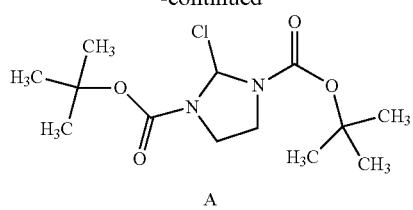

A

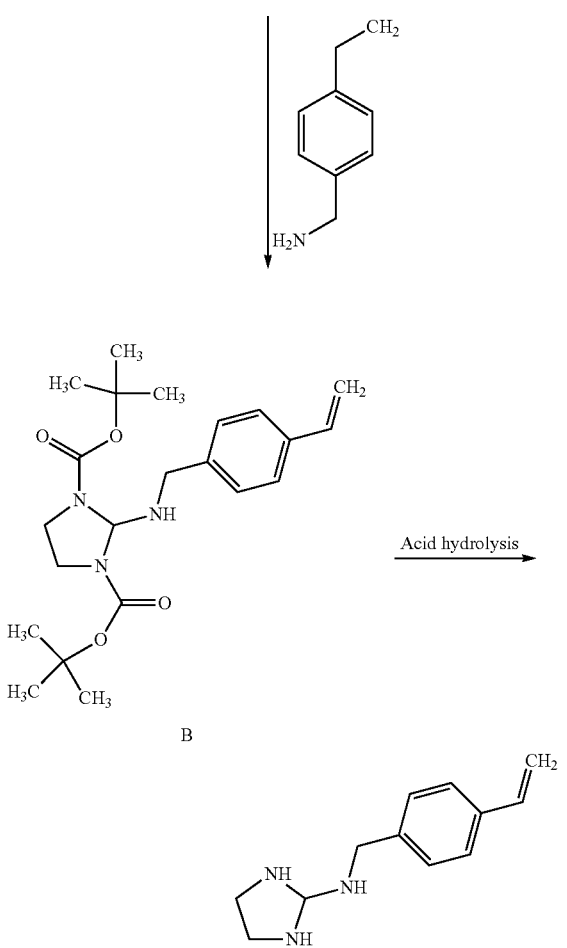

B

Aspects

In a first aspect, the disclosure provides a membrane comprising:

a polymer having appended thereto a ligand,
the ligand comprising at least one moiety represented by the structure:

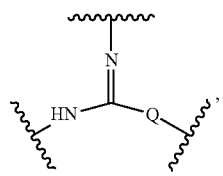

wherein Q is chosen from —$CH_2$—, —N(R)—, or CH(N)—, and wherein R is a $C_1$-$C_{20}$ hydrocarbyl group.

In a second aspect, the disclosure provides the membrane of the first aspect, wherein the moiety is a guanidine moiety.

In a third aspect, the disclosure provides the membrane of the first aspect, wherein the moiety is an amidine moiety.

In a fourth aspect, the disclosure provides the membrane of the first aspect, wherein the moiety has the structure:

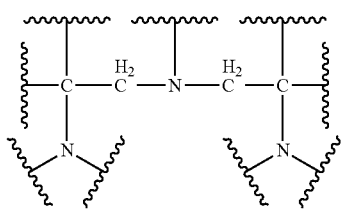

In a fifth aspect, the disclosure provides the membrane of the first or second aspect, wherein the ligand comprises a guanidine moiety attached via a benzyl group having the structure:

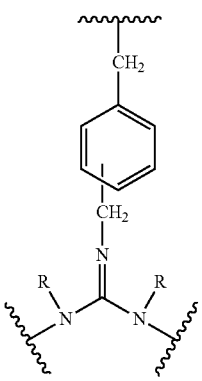

wherein each R is independently chosen from hydrogen, $C_1$-$C_4$ alkyl, cyclohexyl, and phenyl.

In a sixth aspect, the disclosure provides the membrane of the first aspect, wherein the ligand is a compound having the structure:

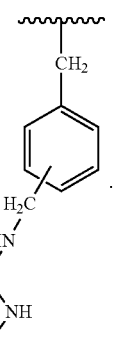

In a seventh aspect, the disclosure provides the membrane of the first or second aspects, wherein the ligand is a compound having the structure:

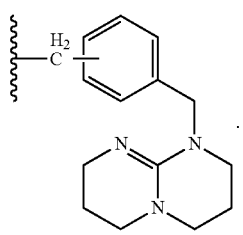

In an eighth aspect, the disclosure provides the membrane of the first or third aspects, wherein the ligand comprises an amidine moiety having the structure:

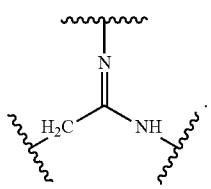 [SMILES: *CC(=N*)N*]

In a ninth aspect, the disclosure provides the membrane of the first aspect, wherein the ligand is chosen from compounds having the structures:

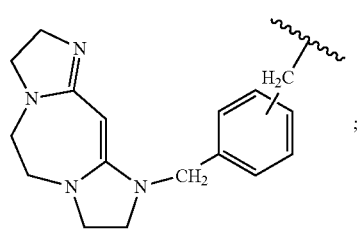

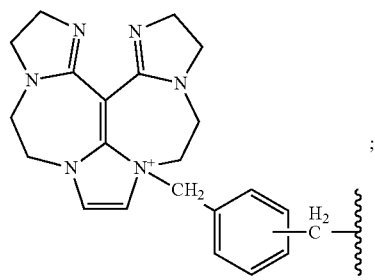

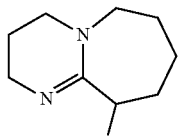

In an eleventh aspect, the disclosure provides the membrane of the first aspect, wherein the ligand is chosen from the structures:

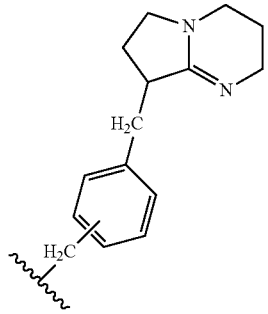

, and

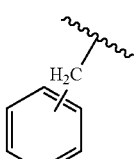

In a twelfth aspect, the disclosure provides the membrane of the first aspect, wherein the ligand comprises the structure:

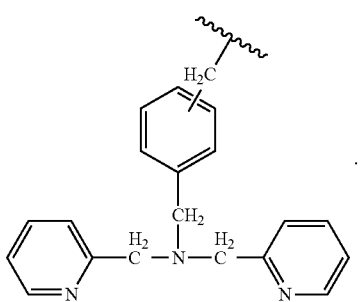

In a thirteenth aspect, the disclosure provides the membrane of the first aspect, wherein the ligand is chosen from polyguanidines.

In a fourteenth aspect, the disclosure provides the membrane of the first aspect, wherein the membrane comprises a porous polymeric filter membrane comprising a polymeric material chosen from a polyamide, a polyimide, a polysulfone, a polyether-sulfone, a polyolefin, a halogenated polymer, or a combination thereof.

In a fifteenth aspect, the disclosure provides the membrane of the fourteenth aspect, wherein the polymeric material is chosen from ultra high molecular weight polyethylene and poly(tetrafluoroethylene).

In a sixteenth aspect, the disclosure provides the membrane of the first aspect, wherein the filter is capable of reducing the amount of Fe in an aqueous amine by at least 50%.

In a seventeenth aspect, the disclosure provides the membrane of the first aspect, wherein the filter is capable of reducing the amount of Fe in an amine by at least 90%

In an eighteenth aspect, the disclosure provides the membrane of the first aspect, wherein the filter is capable of reducing the amount of metals chosen from Na, K, Mg, Mn, Cr, Al, Ni, Zn, Ba, and Pb present in an aqueous amine by at least 50%.

In a nineteenth aspect, the disclosure provides a method for removing an impurity from a liquid, wherein said liquid comprises at least one amine, which comprises contacting the liquid with the membrane of any one of the first through the eighteenth aspects.

In a twentieth aspect, the disclosure provides a filter comprising the filter membrane of any one of the first through the eighteenth aspects.

In a twenty first aspect, the disclosure provides a liquid composition comprising at least one amine and having less than about 1 ppb of iron.

In a twenty second aspect, the disclosure provides the liquid composition of the twenty first aspect, comprising hydroxyl amine having less than 1 ppb of iron.

In a twenty third aspect, the disclosure provides the liquid composition of the twenty second aspect, having less than 0.5 ppb of iron.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A membrane comprising:
   a polymer having appended thereto a ligand, the ligand comprising a moiety represented by the structure:

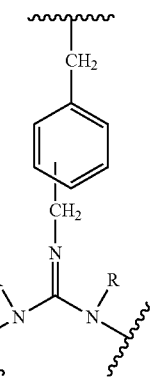

wherein Q is chosen from —$CH_2$—, —N(R)—, or CH(N)—, and wherein each R is independently chosen from hydrogen and a $C_1$-$C_{20}$ hydrocarbyl group, wherein the moiety is directly attached to the polymer backbone, and wherein ~~~ indicates either a point of attachment of the moiety to the polymer backbone or to another group of atoms which form the remainder of the ligand.

2. The membrane of claim 1, wherein the moiety comprises a guanidine moiety.

3. The membrane of claim 1, wherein the moiety comprises an amidine moiety.

4. The membrane of claim 1, wherein Q is —N(R)—, and wherein each R is independently chosen from hydrogen, $C_1$-$C_4$ alkyl, cyclohexyl, and phenyl.

5. The membrane of claim 1, wherein Q is —$CH_2$.

6. The membrane of claim 1, wherein the ligand comprises polyguanidines.

7. The membrane of claim 1, wherein the membrane comprises a porous polymeric filter membrane comprising a polymeric material chosen from a polyamide, a polyimide, a polysulfone, a polyether-sulfone, a polyolefin, a halogenated polymer, or a combination thereof.

8. The membrane of claim 7, wherein the polymeric material is chosen from ultra high molecular weight polyethylene and poly(tetrafluoroethylene).

9. The membrane of claim 1, wherein the filter is capable of reducing the amount of Fe in an aqueous amine by at least 50%.

10. The membrane of claim 1, wherein the filter is capable of reducing the amount of Fe in an amine by at least 90%.

11. The membrane of claim 1, wherein the filter is capable of reducing the amount of metals chosen from Na, K, Mg, Mn, Cr, Al, Ni, Zn, Ba, and Pb present in an aqueous amine by at least 50%.

12. A method for removing an impurity from a liquid, wherein said liquid comprises at least one amine, which comprises contacting the liquid with the membrane of claim 1.

13. A filter comprising the filter membrane of claim 1.

* * * * *